Nov. 3, 1953   E. J. DOWDEN   2,657,749
SPEED REGISTERING DEVICE
Filed June 28, 1951   6 Sheets-Sheet 1
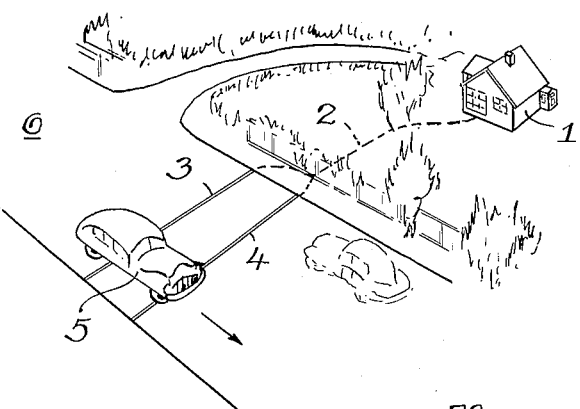
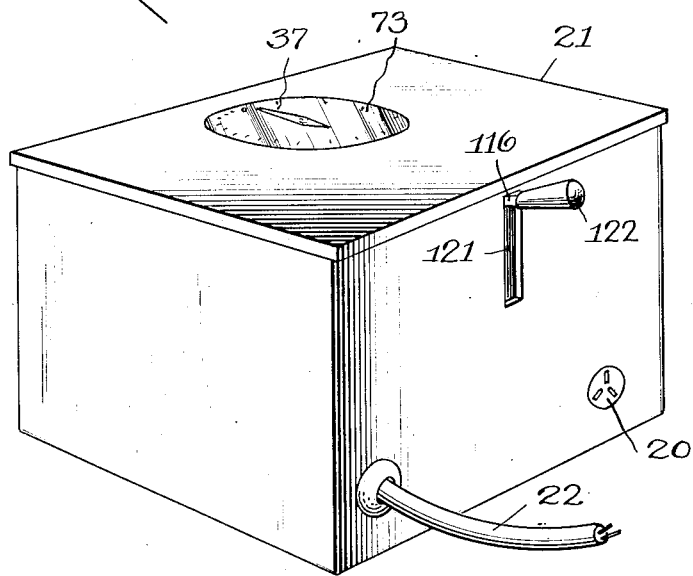
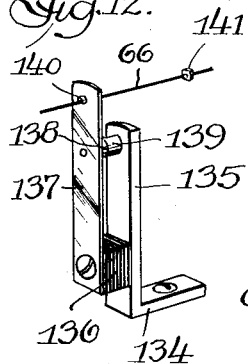
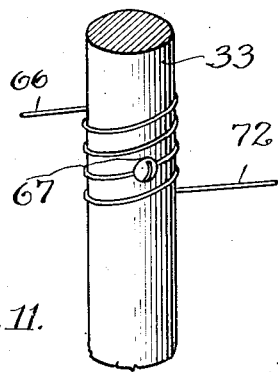
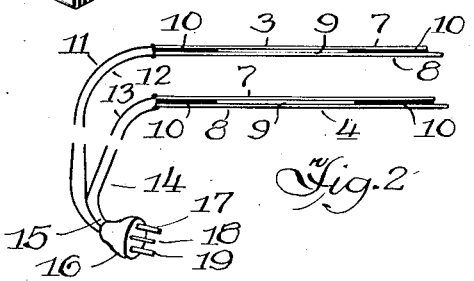
Inventor,
Ernest J. Dowden
By: Frederick F. Mason
Atty.

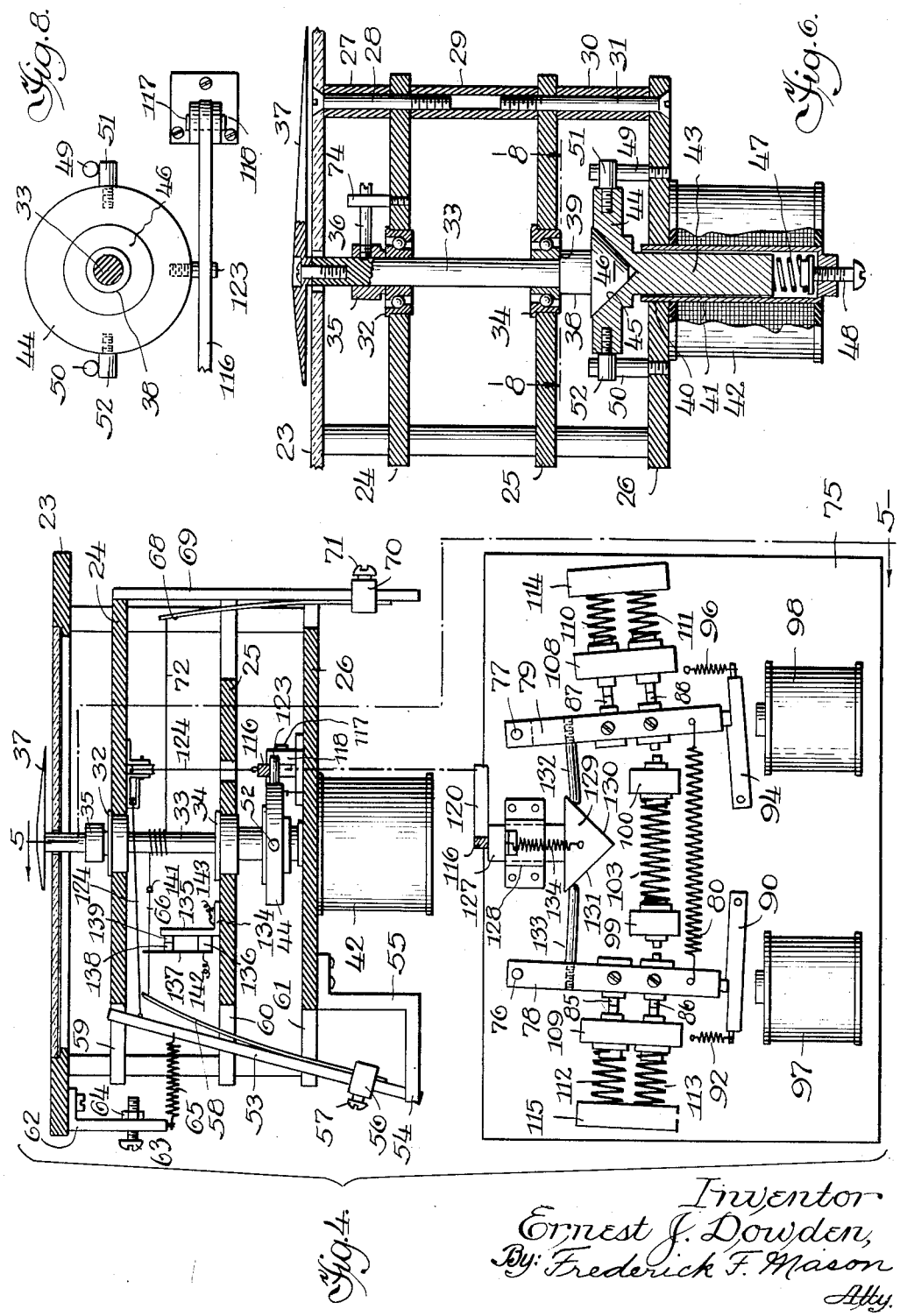

Nov. 3, 1953 E. J. DOWDEN 2,657,749
SPEED REGISTERING DEVICE
Filed June 28, 1951 6 Sheets-Sheet 3
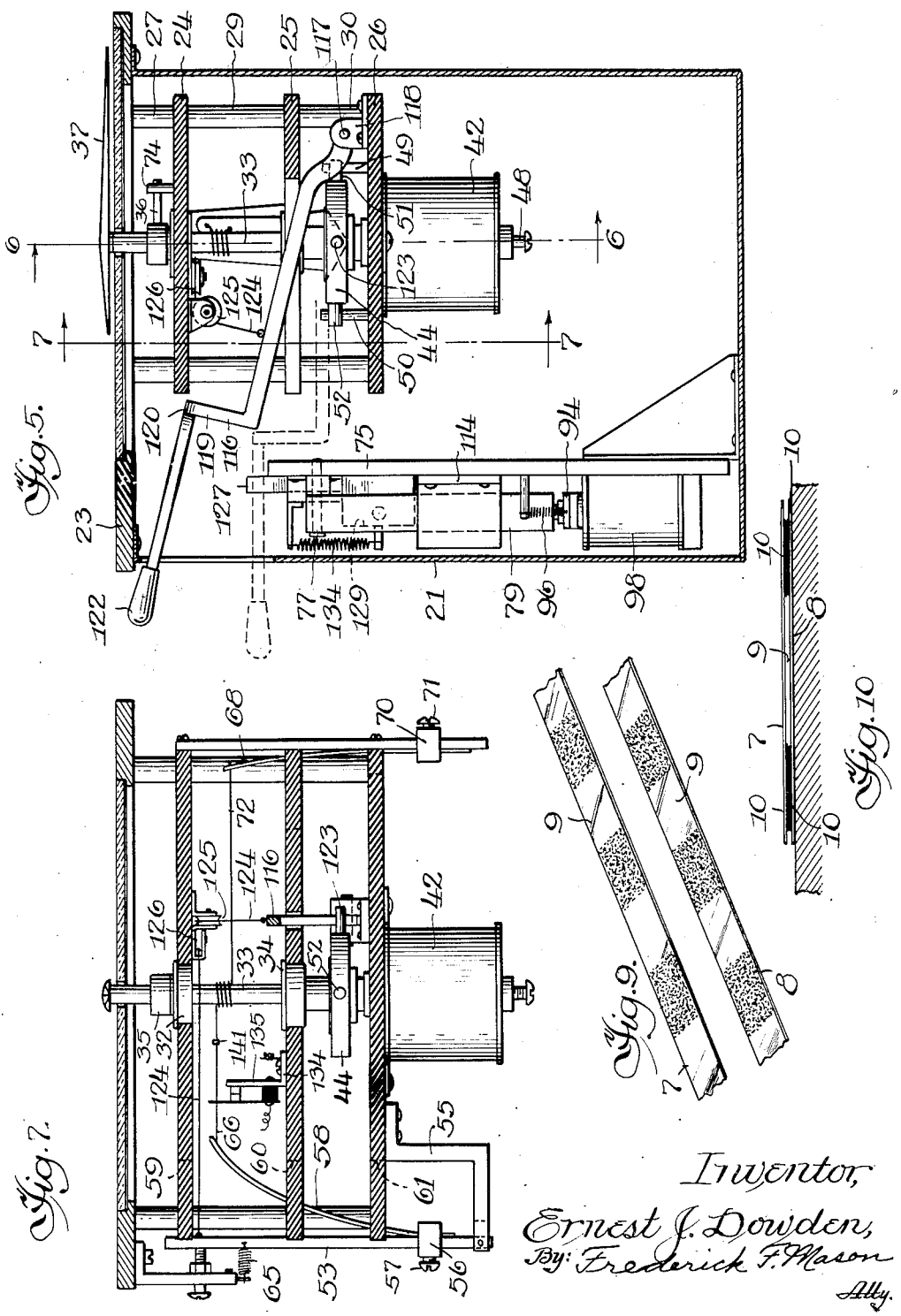
Inventor,
Ernest J. Dowden,
By: Frederick F. Mason
Atty.

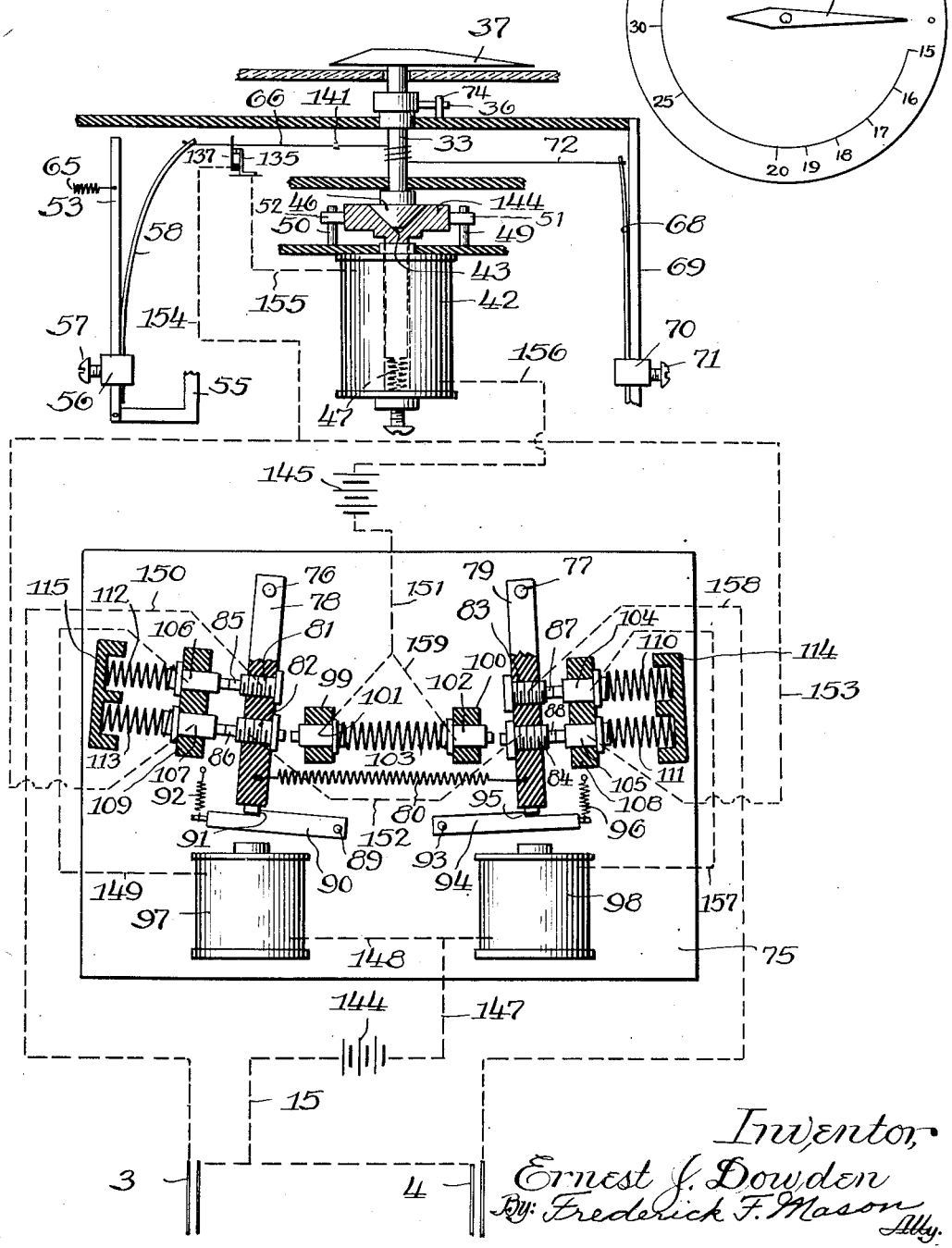

Nov. 3, 1953
E. J. DOWDEN
2,657,749
SPEED REGISTERING DEVICE
Filed June 28, 1951
6 Sheets-Sheet 5
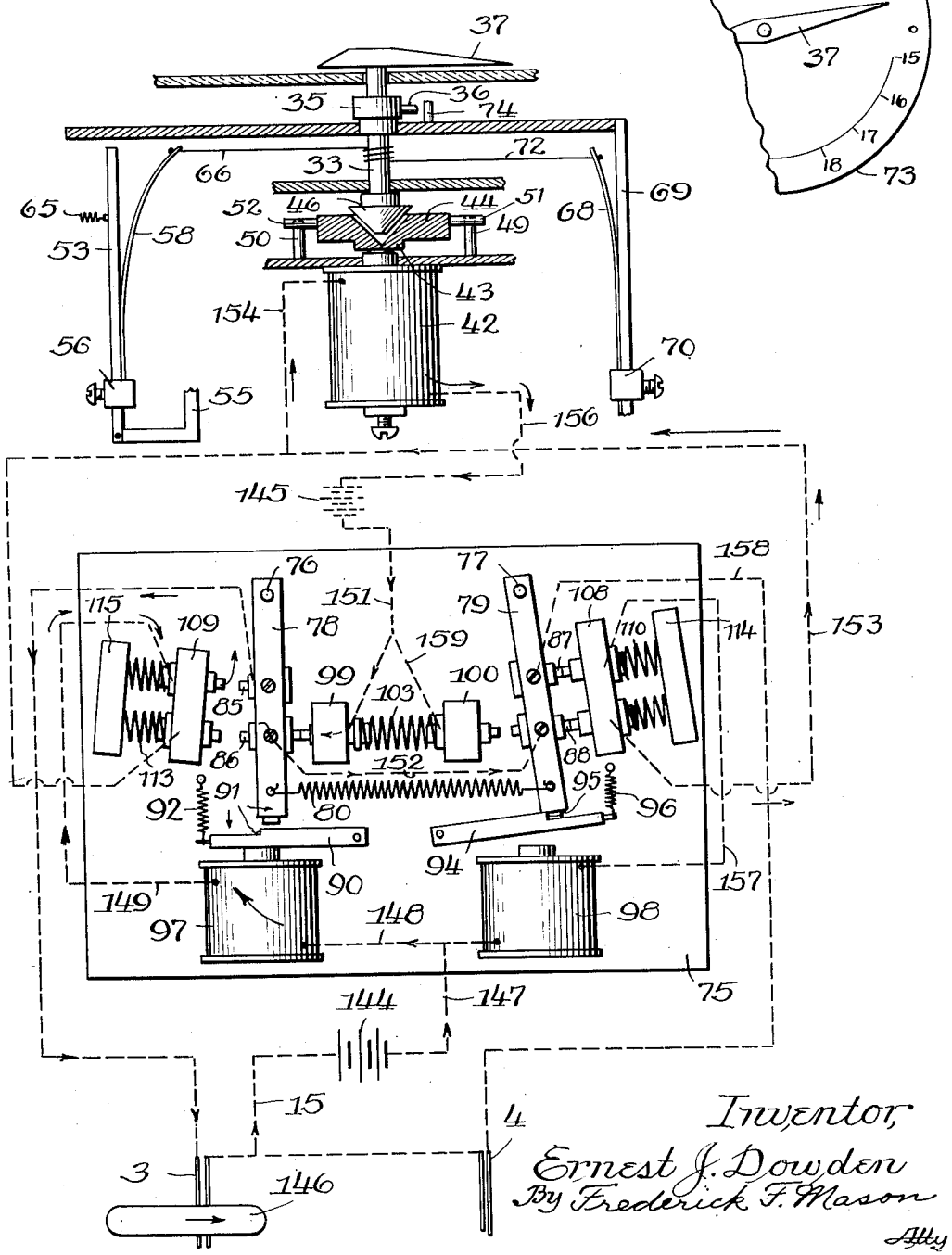
Inventor,
Ernest J. Dowden
By Frederick F. Mason
Atty

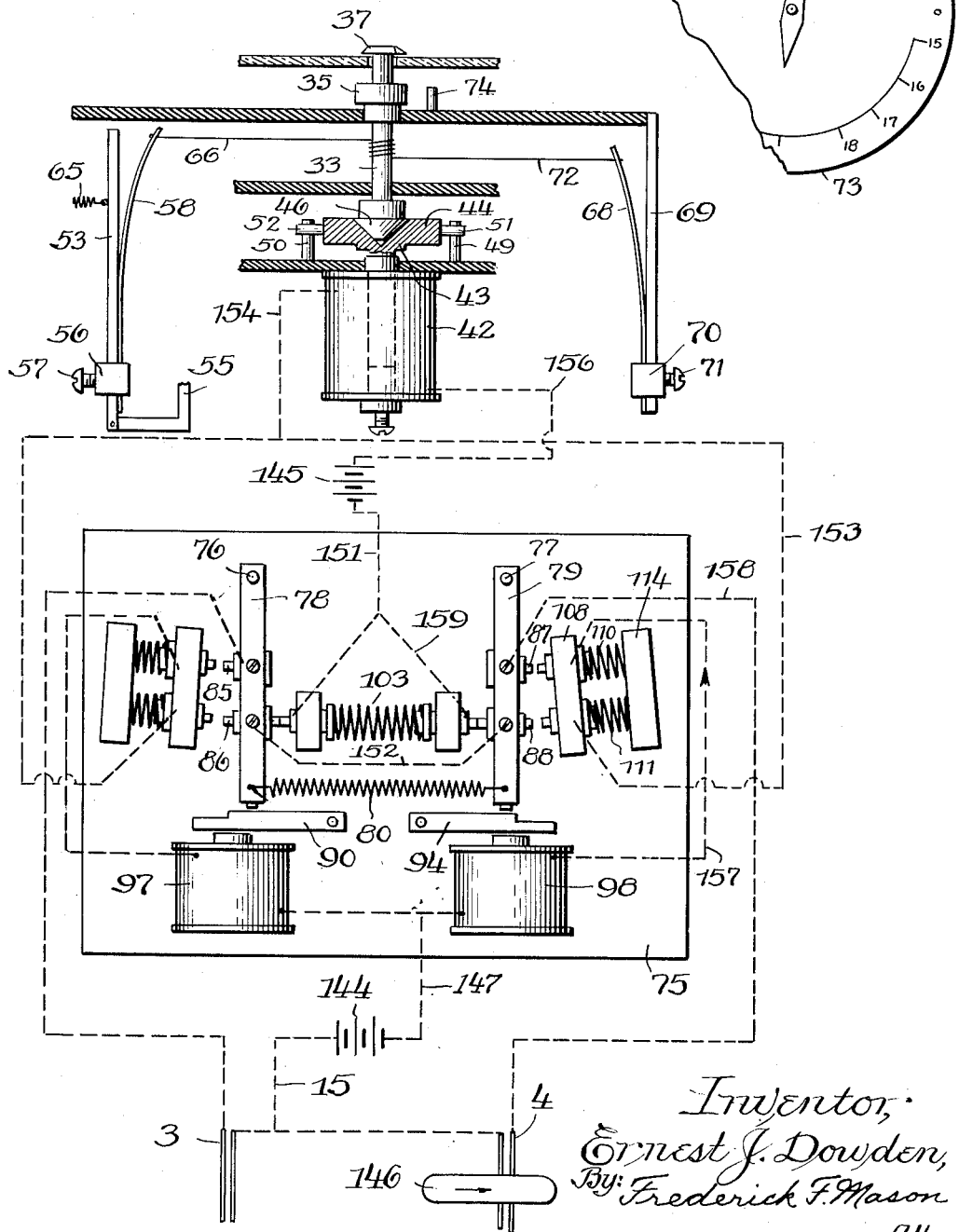

Patented Nov. 3, 1953

2,657,749

UNITED STATES PATENT OFFICE 2,657,749

SPEED REGISTERING DEVICE

Ernest J. Dowden, Ames, Iowa

Application June 28, 1951, Serial No. 234,123

21 Claims. (Cl. 161—18)

This invention relates to apparatus for registering speeds of various devices, and while especially adapted for registering the speeds of automobiles, I wish it understood that it may also be used for registering speeds of such other devices to which it may be adapted. It is arranged for indicating the correct speed of such passing devices in miles per hour. In carrying the invention into practice when used in connection with automobile speeds, a pair of parallel road switches will be positioned on the highway at a predetermined distance from each other. When one or the other of the front wheels of the automobile contacts the first switch, the registering apparatus is instantly started in operation, and when said front wheel reaches the second road switch the registering apparatus is instantly stopped, the apparatus registering the speed in miles per hour the automobile was travelling as its front wheels passed from the first switch to the second switch.

The present invention is an improvement over that of U. S. Letters Patent No. 2,361,826, granted to me October 31, 1944.

Among the object of my invention are: to provide a new and improved speed registering device that is efficient in operation and economical to manufacture; to carry out the above purposes electrically, the speed of electricity being so great that the starting and stopping of the registering apparatus will be effected instantly upon contact of the front wheels with the first and second road switches respectively; to provide a symmetrical arrangement of certain of the parts so that the registering apparatus will operate more correctly, regardless of which longitudinal direction along the highway the vehicle is travelling; to simplify the construction of such apparatus and increase the accuracy of registering the speeds of all vehicles in thick or heavy traffic on any type of constructed highway; and to make use of a short measuring distance with extreme accuracy at all speeds.

Other objects are: to provide a constant speed driving means without the use of an electric motor, and without the need of a constant speed driven electromagnet; to provide an apparatus substituting a stationary solenoid in place of the constant speed electromagnet of my said former patent, and in which a magnetic clutch is replaced by a friction brake which releases at the start of speed registration and closes at the end thereof; to eliminate the need for a clutch and use only a brake for the rotatable pointer shaft to instantly stop the rotation of the pointer upon deenergization of the stationary solenoid; and to provide a novel arrangement of road switches, electric circuits, hook-ups and controls in a device of the type referred to, to enable instant operation of the parts and correct registering of speeds.

Further objects are: to provide a simple but effective rotatable pointer shaft, and new and improved means for resetting the various parts of the apparatus after a vehicle has passed by the two road switches, so that the apparatus can be easily and quickly made ready to register the speed of another vehicle; to provide a safety switch to prevent damage to parts in case the pointer be turned too great an amount; to provide novel means for returning the pointer to the zero reading position after the speed has been registered and noted; to so proportion the speed of rotation of the pointer shaft and the distance between the two road switches that the indicia on the registering dial can be properly applied thereon, and so that speeds can be accurately registered; to provide means whereby adjustments can be made in contact points on a control board thereby increasing the accuracy of speed registration; to provide a novel arrangement of spring power means for obtaining constant speed rotation of the pointer shaft; and to provide resilient mounting for certain of the electric contact points to eliminate bounce-back and interruption of electric circuit.

Other objects, advantages and capabilities, inherently possessed by my invention, will later more fully appear.

My invention further resides in the combination, construction and arrangement of parts illustrated in the accompanying drawings, and while I have shown therein preferred embodiments I wish it understood that the same are susceptible of modification and change without departing from the spirit of my invention.

In the drawings:

Fig. 1 is a perspective view of an automobile passing over a pair of spaced road switches which are wired to register the speed of the car from a distant and unobserved point.

Fig. 2 is a fragmentary, diagrammatic view of a pair of spaced road switches and wiring therefrom to plug into a speed registering apparatus, the road switches forming part thereof.

Fig. 3 is a perspective view of a cabinet within which is housed speed registering apparatus embodying my invention.

Fig. 4 is a median vertical section through the pointer shaft, its operating springs and associated parts, parts being shown in elevation, and looking toward the front face of the control panel, the control panel being dropped to a lower than normal position for clearness of understanding.

Fig. 5 is a vertical offset section on the line 5—5 of Fig. 4, including the walls of the cabinet, and showing the control panel in its normal position with relation to the pointer shaft portion of the apparatus.

Fig. 6 is a vertical section on the line 6—6 of Fig. 5.

Fig. 7 is a vertical section on the line 7—7 of Fig. 5.

Fig. 8 is a horizontal section on the line 8—8 of Fig. 6.

Fig. 9 is a fragmentary, exploded, perspective view of a portion of the upper and lower strips of one of the road switches, before placing them in contact with each other.

Fig. 10 is a fragmentary, longitudinal section of a portion of the upper and lower strips of one of the road switches in contact with each other.

Fig. 11 is an enlarged, fragmentary, perspective view of the pointer shaft, and showing portions of the cords or wires attached thereto for rotating the same.

Fig. 12 is an enlarged, perspective view of the safety switch.

Fig. 13 is a fragmentary, vertical section of the pointer shaft part of the apparatus, and a front elevation of the control panel in somewhat displaced position, partly in section, with the switches thereof in position just prior to a vehicle reaching the first road switch, the electrical circuits being shown in dotted lines.

Fig. 14 is a top plan view of the registering dial and the pointer in the zero position as it would be for the position of parts shown in Fig. 13.

Fig. 15 is a view similar to Fig. 13, except to omit the sectioning of the switches in the control panel of Fig. 13, and showing the parts in their position immediately after one of the front wheels of the car has exerted its weight on the first road switch.

Fig. 16 is a fragmentary view similar to Fig. 14, but showing the pointer just starting to rotate counterclockwise, as it would for the position of parts shown in Fig. 15.

Fig. 17 is a view similar to Fig. 15, but showing the parts in their position immediately after one of the front wheels of the car has reached and exerted its weight on the second road switch, to complete the speed registering operation.

Fig. 18 is a view similar to Fig. 16, but showing the pointer in its final position and registering the speed of the car that has passed the two road switches, as it would for the position of parts shown in Fig. 17.

Referring more in detail to the drawings, in which I have, for illustrative purposes only and not as limiting the scope of the invention, shown one form of my invention, Fig. 1 shows a pair of road switches laid in spaced apart parallel relation on the highway, with wiring leading from the road switches to the registering apparatus located out of sight in a building 1, the wiring being indicated at 2, and the road switches at 3 and 4. The road switches may be spaced apart any desired and precalculated distance, such distance in the present case being ten feet. In the present invention one of the front tires of the automobile 5, when coming from the direction shown in Fig. 1, first contacts the first road switch 3, and closes an electric circuit which energizes a stationary electromagnet, moves an armature trigger or latch to break the first mentioned circuit and instantly close a second circuit and energize a stationary solenoid to release a brake from gripping contact with an indicator or pointer arm shaft. Instantly this indicator arm and shaft are started into rotary motion by the force of a leaf spring and a cord or wire wrapped around the shaft. This rotation of the indicator shaft continues until one of the front wheels of the car contacts the second road switch 4 and closes the same, which in turn opens the circuit which previously had energized the stationary solenoid. The stationary solenoid being deenergized, a brake instantly stops further movement of the indicator arm or pointer and the indicator shaft.

Because of the operating circuit controlling devices, on a control panel in a main cabinet, being arranged in a symmetrical manner with relation to each other, the apparatus will operate the same no matter which longitudinal direction along the highway the car is proceeding.

As seen in Figs. 2, 9 and 10, each of the two road switches, which are similar in construction, comprises an upper strip 7 and a lower strip 8, each formed of flat, thin, flexible steel or the like, copper coated to increase their ability to conduct electrical current. As these two road switches are of identical construction, only one of them will be described in detail. The under side of the upper strip 7 is insulated from contact with the lower strip by a coating of insulating paint, which extends the full length of the strip except at regular spaces of two or three inches intermittently throughout said length the paint is omitted, and the under surface of the upper strip at said spaces is left bare of insulating paint. Likewise the upper surface of the lower strip is similarly coated with insulating paint with similar bare spaces which, when the upper and lower strips are secured together, register with the bare spaces of the upper strip, so that when one of the front tires of the car passes thereover, the upper strip at such bare space under the tire will be bent downwardly under the weight of the car and make electrical contact with the adjacent bare space of the lower strip. The upper and lower strips of each of the road switches are all manufactured and insulated exactly alike, hence in assembly of the road switches it is only necessary to match the bare spaces and secure the ends together where insulated. The insulating paint will prevent the bare spaces from coming together except when a car wheel passes thereover. These bare spaces are indicated at 9, and the insulating paint at 10, in Figs. 2 and 10.

As seen in Fig. 2, road switch 3 is provided with two wires 11 and 12, the former connected with the upper strip and the latter connected with the lower strip. Road switch 4 is provided with two wires 13 and 14, the former connected with the upper strip and the latter connected with the lower strip. Wires 12 and 13 are connected together to form a common wire 15. The above mentioned wires are insulated in a conventional manner, and from where wires 12 and 13 are joined together they continue in the form of a cable connected at its outer end to a plug 16 having three contact fingers 17, 18 and 19. Wire 14 is electrically connected to finger 17, wire 15 to finger 18, and wire 11 to finger 19, which fingers, when the device is in operation, are plugged into complemental openings in the socket 20 in the cabinet 21 shown in Fig. 3, within which cabinet the main portions of the registering apparatus are housed. While batteries may be used in the cabinet as sources of electricity, if the use of an outside source of electricity is desired the same may be led into the cabinet from any suitable outside source through any desired number of wires in cable 22, and appropriately connected to the operating parts within the cabinet.

With the road switches in position on the highway and spaced ten feet apart in parallel relation, and the road switch plug 16 being plugged into the socket 20 of the cabinet, the apparatus is ready to be operated to automatically close and open the circuits as described later herein.

*Indicator shaft supporting frame*

Referring to Fig. 6, the frame work for supporting the indicator shaft and associated parts of the speed registering apparatus, comprises a top 23 which constitutes the top of the cabinet, and three vertically spaced apart horizontal plates or platforms 24, 25 and 26. Platform 24 is spaced downwardly from top 23 by posts 27, preferably one at each of the four corners of the platform, these posts being secured at their ends to the top and to platform 24 in any suitable manner, as for example by screws 28. Platform 25 is held in downwardly spaced relation to platform 24 by similar posts 29, and the bottom platform 26 is held in downwardly spaced relation to platform 25 by similar posts 30. Screws 31 extend upwardly through platform 26, through posts 30, and are threaded into posts 29, while screws 28 extend downwardly through top 23, through posts 27, and are threaded into posts 29. By tightening screws 28 and 31, a rigid frame work is provided, however any other suitable arrangement of securing means for the platforms may be used as desired.

These platforms or supports, together with the attaching screws and posts, are all formed of nonmagnetic material, such as brass, Bakelite, or some other rigid but nonmagnetic material as may be desired.

*Indicator shaft mechanism*

Mounted centrally in platform 24 (Fig. 6), is a ball bearing unit 32, through the inner member of which extends the indicator shaft 33 which is made of nonmagnetic metal, preferably brass. Mounted centrally in platform 25 is a similar ball bearing unit 34 through the inner member of which the indicator shaft 33 also extends. The ball bearing units 32 and 34 support the shaft 33, with the weight of the shaft resting on the inner member of ball bearing unit 32 by reason of the collar 35 resting thereon, which collar is fixed to the shaft by means of the elongated set screw 36 which extends radially therefrom. It is thus seen that parts 35 and 36 will travel with the shaft in rotary motion. At the upper end of shaft 33 is fixed the pointer or indicator arm 37 which travels in a circular path with the shaft as it rotates.

Near the lower end of shaft 33 is an increased diameter portion 38 providing a shoulder 39 which prevents the shaft from moving upwardly. Below the enlarged portion 38, the lower end of the shaft is still further enlarged into a cone-shaped foot forming a brake surface against which the solenoid operated brake, later more fully described, acts.

Still referring to Fig. 6, it will be seen that the lower platform 26 is formed with a central opening 40 in axial alinement with the central openings in platforms 24 and 25. In opening 40, and secured to platform 26, is the core 41 of the stationary solenoid, surrounding which solenoid are copper wire windings 42. Solenoid core 41 is of brass, bronze, or the like. Longitudinally movable in core 41 is the stem of a steel brake member 43, formed at its upper end with an enlarged head 44, having in its upper central face a conical recess 45 of a shape complemental to that of the cone-shaped foot 46 of the shaft 33. Positioned between the bottom end of the stem of brake 43 and the closed end of core 41 (or other suitable bottom plate of the stationary solenoid), is a coiled push spring 47 having an adjusting screw 48 for adjusting the compression of spring 47 as desired. The stationary solenoid, when its windings 42 are energized with an electric current, will pull the steel brake downwardly against push spring 47, thus removing the brake pressure between brake 43 and shaft foot 46, and permit rotation of shaft 33. When these solenoid windings are deenergized, the spring 47 will push the brake upwardly and force the brake tightly against the shaft foot 46, and immediately stop further rotation of the shaft. The shoulder 39 of the shaft enlargement 38 will rest against the inner member of ball bearing unit 34 and hold the shaft foot 46 in close proximity with brake 43.

Secured in the bottom platform 26 are two upstanding posts 49 and 50, adjacent to but slightly spaced from the periphery of brake head 44. Fixed to, and extending radially outwardly therefrom at diametrically opposite points, are two horizontal posts 51 and 52 formed of nonmagnetic material, and extending slightly beyond posts 49 and 50. Posts 49—52 are so positioned as to permit vertical movement of steel brake 43 but prevent any rotary movement of the brake. When the brake is thus held stationary in closed position it will prevent any rotary movement of shaft 33 and pointer 37.

In Fig. 6 it is seen that shaft 33 is supported in the two spaced apart bearings 32 and 34, and cannot move downwardly because of collar 35 secured to the shaft and resting on the inner member of the ball bearing unit 32, and cannot move upwardly because of shoulder 39 resting against the under side of the inner member of the ball bearing unit 34. Thus, shaft 33 cannot move either upwardly or downwardly, but can move very freely in a rotative direction when the brake is held away from the cone-shaped foot of the shaft. The shaft 33 will be held stationary by the brake through action of push spring 47, at all times except when the windings 42 of the stationary solenoid are energized to disengage the brake from the shaft. Due to the instantaneous action of the stationary solenoid 42 through being electrically energized and then deenergized, the instantaneous starting and stopping of the indicator shaft 33 can be accomplished.

Referring to Fig. 4, a swingable arm 53, which is preferably a metal strip or bar of substantial rigidity, is pivoted at 54 to a metal angle or bracket 55 secured to the bottom platform 26. Attached to the lower end portion of arm 53 is an adjusting clamp 56, within which is adjustably fixed by means of the adjusting screw 57 the lower end of an elongated flat, tempered, leaf spring 58. Platforms 24, 25 and 26 are formed at their edge adjacent arm 53, with inwardly extending slots 59, 60 and 61, to permit swinging movement of arm 53 and its elongated flat spring 58, with relation to said platforms. Secured to cabinet top 23, and depending therefrom, is a bracket 62 having a horizontal adjusting screw 63 provided with a lock nut 64 to positively hold it in various adjusted positions. Extending between the lower end of bracket 62 and the upper portion of arm 53 is a tension spring 65 normally biasing the upper end of arm 53 to move into contact with the inner end of adjusting screw 63, as will be understood in Figs. 4 and 7.

Attached at the upper end of the flat elongated spring 58, is a cord or flexible wire 66 which is wound one or more times around indicator shaft 33 and fastened thereto by a screw 67 (see Fig. 11), or any other suitable means as desired.

Referring to Fig. 7, and noting that the arm 53 is held against adjusting screw 63, that the adjusting means 56—57 is properly adjusted to provide the exact desired spring pressure from flat spring 58, and that the cord or wire 66 is wound around shaft 33 and secured thereto, it will be seen that the shaft 33 will rotate in a counterclockwise direction, because of the spring pressure exerted from the flat elongated spring 58 through the cord or wire 66 wound round the shaft, unless the shaft is held against rotatable motion by the brake 43.

It will be noted here that the energy, heretofore needed and furnished by an electric motor, is in the present invention furnished by the operator. When the operator manually resets the apparatus, as later more fully described, he furnishes the energy in manually resetting the apparatus, this energy being stored up in the flat elongated spring 58, and is there waiting to be used when the brake 43 is released in the next speed registration. This is a very important feature in the present invention.

As seen in Figs. 4 and 7, there is also provided a tempered, flat, elongated counterbalancing spring 68, on the side of the frame opposite the side having the arm 53 and spring 58. This counterbalancing spring is adjustably mounted near the lower end of the upright arm 69, which is rigidly fixed to the platforms. This mounting of spring 68 on stationary arm 69 is accomplished by an adjustable clamp 70 having an adjusting screw 71, the operation of this adjustable clamp 70 being the same as that of clamp 56 on arm 53, to wit for adjusting the flat elongated spring 68 to give the desired pressure when flexed.

A cord or wire 72 is fixed to the upper end of flat elongated spring 68, and extends to the shaft 33 where it is wound one or more times around the shaft in the opposite direction from that of cord 66. Spring 68 is weaker than spring 58 for a reason later explained. It is thus seen that the tendency of the pressure from spring 58, when unwinding cord 66 from shaft 33 is to rotate the shaft in a counterclockwise direction, while the tendency of spring 68 is to rotate the shaft in a clockwise direction. It will also be seen that the force of flat spring 58 is being constantly exerted against that of the weaker flat spring 68.

The reason for the flat spring 58 being so mounted on arm 53, and pivotally carried by arm 53, is for reset purposes as later more fully explained.

Referring to Figs. 3, 14, 16 and 18, there is provided on the upper surface of the cabinet top wall, concentric with shaft 33, a registration dial 73 having numerals denoting miles per hour from 15 to 100. In Fig. 14 the pointer arm 37 is shown standing at zero or starting position, at which time the radial pin 36 (Fig. 6) will be in contact with post 74 upstanding from platform 24. When the pointer stands at zero or starting position, and the brake 43 is in braking engagement with shaft 33, the switches and associated working parts are in starting position on the control board 75 as shown in Fig. 13, and are ready for a car registration.

The respective, but different, spring pressures of the flat springs 58 and 68 having been properly adjusted through adjustments 56 and 70, and arm 53 being held in contact with the end of adjusting screw 63 by tension spring 65, release of the steel brake 43 from shaft 33 by action of the solenoid 42, will under the greater power exerted by flat spring 58 over the flat counterbalancing spring 68, rotate the shaft 33 and pointer 37 around the dial in a counterclockwise direction, at the proper rotating speed to correspond with the spacing of the numerals in degrees, thus giving the correct reading in miles per hour.

While more than one complete revolution of shaft 33, and with it pointer 37, is not required in the operation of this apparatus, yet in but one revolution of the shaft a certain amount of momentum is built up. While the pressure from spring 58 will start the shaft rotating instantly once the brake is released, and can rotate the shaft for a maximum of only one revolution at a very near constant speed from start to a full turn, yet a certain amount of momentum, even if very small, is built up in that one revolution. For this reason, counterbalancing spring 68 is used, which is of lighter material and has less spring tension than does flat spring 58. Flat counterbalancing spring 68 is so made and adjusted that it does not exert pressure, or at least any effective pressure, against counterclockwise rotation of shaft 33 until near the end of the revolution of that shaft. It is so adjusted as to offset the very small gain in momentum of the shaft during the one revolution, at or near the end of that one revolution.

The control panel

In Figs. 4, 13, 15 and 17, the control panel or board 75 has, for convenience of understanding and to avoid hiding other parts, been shown at a lower level than it occupies with relation to the indicator shaft mechanism, as will be understood in Fig. 5 where these parts are shown in their correct relative positions. The control panel is formed of Bakelite, or some other good material nonconductive of electricity, approximately one eighth inch in thickness, five inches wide and six inches long. As will be understood, other dimensions may be used as found most suitable. Pivotally mounted at 76 and 77 (see Fig. 13), near the top of the control panel, are two swingable arms 78 and 79, adapted to swing in a pendulum manner to a limited degree. A coil tension spring 80 is fastened between the lower end portions of arms 78 and 79 to bias them to swing toward each other at their lower ends when free of restriction. Arms 78 and 79 are made of Bakelite, or other insulating material, and have threaded into them about midway of their length, contact point holders 81, 82, 83 and 84, formed of metal, and into which the contact points 85, 86, 87 and 88 are embedded and made fast. Located at the lower end of arm 78, and pivoted at 89 to the control panel, is a steel armature latch 90 having a shoulder 91 adapted to be normally urged into holding engagement with the reduced inner lower edge of arm 78 by a tension spring 92 fastened at one end to the control panel and at the other end to the free end of latch 90. At the lower end of arm 79 is pivotally mounted at 93 to the panel, a similar steel armature latch 94 having a shoulder 95 adapted to be normally urged into holding engagement with the reduced inner lower edge of arm 79 by a tension spring 96 fastened at one end to the panel and at the other end to the free end of latch 94.

Mounted on the control panel, a slight distance below armature latches 90 and 94, are a pair of electromagnets 97 and 98 respectively, and so arranged that when their respective windings are electrically energized they will pull the complemental latch downwardly, and when deenergized they will release the armature latches to move upwardly under the action of springs 92 and 96. Secured to the panel in the central portion thereof, is a pair of standards 99 and 100 formed of Bakelite, or other suitable insulating material. Standard 99 is positioned a slight distance inwardly of arm 78 opposite contact point holder 82, and standard 100 is positioned a slight distance inwardly of arm 79 opposite contact point holder 84. Slidably mounted longitudinally through a hole in the center of each of the standards 99 and 100 is a brass contact point holder 101 and 102 respectively.

These point holders are yieldably held in position by a push coil spring 103 pressing at its opposite ends against enlarged flanges on the point holders to hold them tightly but yieldably against the standards 99 and 100. Each of these point holders has fixed therein an outwardly projecting contact point. From this construction it is seen that these point holders 101 and 102, together with their contact points, can move horizontally inwardly toward the center of the panel, when pressure is exerted against the point of either great enough to overcome the push spring 103. For example, when the armature latch 90 is drawn downwardly away from the reduced lower end of arm 78, the coil pull spring 80 will instantly pull the arm 78 inwardly. The inner contact point in point holder 82 will immediately strike against the contact point in point holder 101, and the pressure exerted by pull spring 80 being slightly greater than the push of push coil spring 103, the slidable point holder 101 will move slightly inwardly until the spring pressures of springs 103 and 80 are equalized. The point holders 104, 105, 106 and 107 are made the same and act in the same manner, they being yieldably held in place, in stationary standards 108 and 109, by coil push springs 110, 111, 112 and 113 respectively which are seated at their outer ends in seats in stationary members 114 and 115 which like standards 108 and 109 are fixed to the panel.

The advantage of this arrangement of yieldable point holders is two-fold; first, it prevents a rebound of one of the contact points with relation to the other which rebound would temporarily open the circuit closed by these two points, which is eliminated by this yieldable mounting; and second, the enlarged flanges of these point holders against which the push springs push, enables very thin washers to be inserted between these shoulders and the respective standard to give a finer degree of adjustment of the distances between the coacting contact points. The distance between all open points must be the same, so that the apparatus will register the same regardless of which direction the car is proceeding along the highway. In addition to the above advantages, a wiping effect is obtained between the two points coming together and then sliding together horizontally, this wiping action tending to wipe away any accumulated corrosion on the points' surfaces.

*The reset mechanism*

The reset mechanism is shown in Figs. 4, 5 and 7, in which is provided a strong offset lever arm 116, pivoted at 117 to a member 118 fixed to bottom platform 26. This lever arm is offset upwardly at 119 to give its outer end sufficient height to operate above the upper edge of control panel 75, and it is again offset, laterally at 120, to position its outer end over the center of the control panel as will be understood in Fig. 4. The outer end of this lever arm operates vertically in a slot 121 formed in the front wall of the cabinet, on which outer end is fixed a handle member 122 for convenience of operation. Lever arm 116 is capable of vertical movement only. The solid lines in Fig. 5 show it in the upper position before reset is made, and the dotted lines show it in the lower position when the reset has just been made.

As seen in Figs. 4, 5 and 7, the head 44 of brake 43 is formed with a horizontal, outwardly extending radial post 123, spaced circumferentially 90 degrees from horizontal posts 51 and 52, which post 123 will be contacted by lever arm 116 as it approaches its lower limit of movement to move brake 43 downwardly and separate it from the cone-shaped foot 46 of shaft 33 to release the shaft to be free for rotation. Fixed at one of its ends to lever arm 116 is a cord or flexible wire 124, which passes over a vertical sheave pulley 125 and a complemental horizontal sheave pulley 126 to divert the cord or wire laterally to the top portion of swinging arm 53 to which it is fastened. With the cord 124 taut when lever 116 is up and arm 53 is vertical, it will be seen that a downward movement of lever 116 to resetting position, will simultaneously swing arm 53 inwardly near to flat spring 58 which will relieve the stress in the latter and permit the counterbalancing spring 68 to move at its top to the right, as viewed in Fig. 17. This will, through cord 72 which is wound round shaft 33, cause the shaft to rotate clockwise when viewed from the top, and return the pointer to zero position. This is merely returning spring 68 under its own power to the right, the same distance that it was moved to the left in making the registration, which is made possible because the stress has been relieved in flat spring 58 due to the movement of arm 53 to the right in Fig. 4 when the reset arm 116 was pushed down by grasping handle 122. It must be remembered that this clockwise movement of shaft 33 by flat spring 68 is possible because brake 43 was moved away from the shaft on the downward movement of the reset lever 116. In resetting the parts, the pointer 37 is stopped at the zero point because of the shaft 33 stopping at that position due to the horizontal post 36 carried by the shaft striking the vertical post 74 fixed to platform 24, as seen in Fig. 6.

Referring to Fig. 4, the control panel 75 is so positioned in the apparatus that the resetting lever arm 116, when nearly at its lowest point, comes in contact with the top end of the stem 127, slidably mounted in keeper 128 secured to the control panel 75, said stem having fixed at its lower end a forwardly extending sliding wedge 129 having inclined side faces 130 and 131. Said swingable switch arms 78 and 79 have fixed thereto inwardly extending posts 132 and 133, the inner ends of which are engaged by the inclined sides 130 and 131 of the sliding wedge 129, to spread these swingable arms apart when the sliding wedge is pushed downwardly by the resetting lever. When the resetting lever 116, under action of spring 65 (Fig. 4), is moved upwardly after completion of the resetting operation, the sliding wedge simultaneously moves upwardly under action of pull spring 134, to leave the swingable arms 78 and 79 free to move toward each other during the speed registering operations, as later more fully explained. The outward movement of swingable arms 78 and 79, by the sliding wedge, resets the armature latches 90 and 94, as will be understood in Figs. 4 and 13, which holds these swingable arms in position ready for another speed registering operation.

It should be remembered that downward movement of the resetting lever 116, through cord 124 and spring holder arm 53, moves flat spring 58 to the right in Fig. 4, and relieves its stress sufficiently to permit the weaker flat spring 68 to return the shaft and pointer to zero or starting position, and upward movement of the resetting lever arm when released permits the pull spring 65 to pull the spring holder arm 53 back into contact with the adjusting screw 63 and to again set up stress in flat spring 58 which is transmitted to cord 66, ready to start another speed registering operation. As stated, the downward movement of the resetting arm 116 releases the brake from the indicator shaft to permit the pointer, under action of flat spring 68, to return to zero, and upward movement of this arm again sets the brake to prevent rotation of the shaft until the brake is again released at the start of another speed registering operation.

*Safety switch*

Referring to Figs. 4, 7 and 12, I have provided a safety switch to open the circuit to the solenoid 42 and apply the brake to stop further rotation of the shaft, in the event the registering operation should for any reason proceed beyond a desired maximum limit. The safety switch comprises an angle base 134, of conducting material, secured in any convenient position on one or the other of the platforms 24 or 25, so as to be conveniently located with relation to cord 66. In Figs. 4 and 7 it is shown located on platform 25. Base member 134 has an extending arm 135 having mounted near one end an insulating pad or block 136 to which is fixed one end of a flat spring 137 carrying a contact point 138 adapted to be engaged with and disengaged from contact point 139 on the base member, as the spring 137 is relaxed or bent. Flat spring 137 extends beyond contact point 138 to provide an end having an opening 140 (see Fig. 12), through which the cord or wire 66 passes as it moves longitudinally therethrough during a registering operation. Fixed upon cord 66 in a predetermined selected position is a button 141 of larger diameter than opening 140 in the spring 137, so that when the cord moves beyond the maximum limit the button will strike the spring 137 and bend it to the left in Fig. 4, and disengage contact point 138 from contact point 139 to open the circuit to the solenoid and deenergize its windings 42, apply the brake, and stop the shaft. Electrically connected to the safety switch is a wire 142 connected to the spring arm 137, and a wire 143 connected to the metal base member 134, these wires forming part of the circuit to the solenoid windings 42.

*Operation of electrical circuits*

The operation of the electrical circuits for the general operation of the registering apparatus will now be described.

Assuming that plug 16 from the road switches shown in Fig. 2 has been plugged into socket 20 of the cabinet, and that the proper electrical source is available, which source may be small storage batteries contained within the cabinet, or an outside electrical source led into the cabinet through cable 22, as desired, and that the indicating pointer and associated parts have been reset to the starting position, the apparatus is ready for a speed registering operation. For illustrative purposes only, the electrical source has been shown in Figs. 13, 15 and 17 as storage batteries 144 and 145.

Referring first to Fig. 13, which shows the parts in their starting position, it will be noted that the electromagnets 97 and 98 are deenergized, and the swingable arms 78 and 79 have been swung outwardly by the resetting apparatus and are held in that position by armature latches 90 and 94. Next assuming that one or the other of the front tires 146 of the approaching car has closed the first road switch 3 as indicated in Fig. 15, and considering both of Figs. 13 and 15, as the transition from Fig. 13 to Fig. 15 will take place instantly when the first road switch is closed, it will be understood from Fig. 13 that at the instant of closing the first road switch 3 the current wil flow through the common wire 15, through the battery 144 and wires 147 and 148 through the windings of the electromagnet 97. From electromagnet 97 the current will flow through wire 149, through contact point holders 106 and 81 and their points, through wire 150, and back to the closed road switch 3 to complete this circuit. The current will not at first pass through the electromagnet 98 for the reason that this circuit is connected to the second road switch 4, which at the present instant is open because one or the other of the front tires 146 has not yet reached it.

The effect of closing this first circuit described above is to energize the stationary electromagnet 97 and pull the armature latch 90 downwardly which frees its shoulder 91 from the lower end of swingable arm 78, which arm under the action of pull spring 80 will instantly move inwardly to the right as viewed in Fig. 13. This places the parts in the position shown in Fig. 15, with the contact points of point holders 106 and 81 and 107 and 82 separated which renders the first road switch 3 dead. At the same time the contact points of point holders 82 and 101 are brought into electrical contact which closes the next circuit and current flows from battery 145 through wire 151, point holders 101 and 82 and their contact points, wire 152, point holders 84 and 105 and their points, wire 153, wire 154, the safety switch 135—137, wire 155, the stationary solenoid 42, and wire 156 back to the battery 145, thus completing this circuit. This energizes solenoid 42, drawing the steel brake 43 downwardly against push spring 47, thus releasing the brake from the indicator shaft which is left free to rotate, and releasing pressure from the flat spring 58 to rotate shaft 33 and move pointer 37 from the position shown in Fig. 14 to whatever number indicating miles per hour is shown on the dial 73, as for example the position shown in Fig. 18. The number indicating miles per hour over which the pointer stops will be that speed indicated by the car passing between the first and second road switches.

This circuit last described, which energizes the winding of the solenoid 42, remains closed until one or the other of the front tires 146, of the automobile, closes the second road switch 4, as indicated in Fig. 17 (the first road switch 3 being dead at the time now referred to), and closes the electric circuit now described. It should be noted that at this time the switch 81, 106 is open, and that switches 82, 101, and 83, 104, and 84, 105 are closed (see Fig. 15 which shows the positions of parts just immediately prior to the front tire reaching the second road switch 4). Immediately upon the front tire closing the second road switch 4, and still considering Fig. 15 but remembering that road switch 4 is closed (the transition from Fig. 15 to Fig. 17 being instantaneous), current will flow from the closed road switch 4 through the common wire 15, the battery 144, wire 147, through electromagnet 98 (it cannot flow through electromagnet 97 because road switch 3 is dead), wire 157, switch 104, 83, wire 158 and back to road switch 4, thus completing this circuit.

The result of the closing of the last mentioned circuit is that electromagnet 98 is energized and draws the armature latch 94 downwardly which frees its shoulder 95 from the reduced lower end of swingable arm 79 and permits this arm to swing inwardly under the action of pull spring 80, thus opening switch 104, 83 and rendering road switch 4 dead. This inward swinging of arm 79 also opens switch 105, 84, thus instantly deenergizing solenoid 42 and under action of the push spring 47 applying brake 43 to the shaft 33, instantly stopping the pointer 37 at whatever speed has been registered on the dial from the passage of the car front tires from the first road switch to the second road switch.

The method used for manually resetting the apparatus to starting position for the next car speed registration has been previously explained, it only being necessary here to state that for convenience and clearness of understanding, the resetting mechanism has been omitted from Figs. 13, 15 and 17, but it should be understood that these figures are to be construed as though the resetting mechanism of Fig. 4 were applied thereto.

The elimination in the present invention of an electric motor and a rotating electromagnet, such for example as shown in my said Patent 2,361,826, increases the accuracy and reduces the manufacturing cost very considerably. In any speed registering apparatus accuracy is the most important factor, secondly is simplicity and low cost of production. When depending for constant rotating motion, upon electric motors in a speed registering apparatus, some variation in speed must be encountered in all cases. When depending on transmission of that constant rotating motion through either reduction gears or belt drive, further variation in speeds must be encountered. These variations in rotating motion have been eliminated in the present invention. By adoption of power or force from spring pressures rather than from power supplied by an electric motor, much greater accuracy is achieved in speed registration. The flat elongated spring of the present invention, in which if desired I may also use a pull coil spring in the same manner, does rotate the shaft and indicator in a more constant speed than does an electric motor and electromagnetic clutch.

The present invention is not dependent upon closing a clutch at the start of registration, but to the exact opposite it is dependent upon opening a clutch or brake. In the present invention but one action, that of stopping by braking, is dependent on friction. Opening the brake is instantaneous by the electric solenoid, and no friction is used in starting the indicator and indicator shaft. The ever constant pressure exerted by the spring 58 will start the indicator and indicator shaft the same each registration. This, as I have proven by research and experimentation to be true, makes a great improvement in accuracy of speed registration where, as in this case, time is measured in one-thousandth of one second.

While I have shown and described my invention as involving two spaced apart road switches, I wish it understood that any suitable means for controlling suitably spaced apart switches other than road switches such as I have described, may be used if desired. For example, my invention may be used in conjunction with two electric eyes or photocells. These electric eyes or photocells would replace the described road switches, the beams being placed ten feet apart at right angles to the direction of traffic and when either beam is interrupted an electric circuit will be closed to the registering device, as is otherwise accomplished by the tire compressing the road switch. The frontmost part of the vehicle would interrupt the ray beam.

Attention is called to the importance of the means used for closing and opening the electric circuit to the windings of the solenoid, and the manner in which the circuit is broken to the road switches so instantaneously that before the tire has left the road switch the circuit has been broken within the device itself, and thereby has accomplished two important results, first, it eliminates the possibility of interference from the second tire of the vehicle at even the highest speeds, and second, that the heat from the arc when the circuit is broken is taken by the ignition points within the device and is not taken within the road switch where proper ignition points could not be used. Such arc, if occurring in the road switch, would soon destroy the metal in the road switch if the circuit were broken at that point. Such arc should not be permitted at any point other than the ignition points within the device.

Having described my invention, I claim:

1. In speed registering apparatus in combination, a pair of spaced apart initiating devices, a dial having an indicator pointer rotatable thereover, a rotatable shaft to which said pointer is fixed, a brake movable axially of the shaft into and out of braking engagement with the shaft, spring means for rotating said shaft upon release of the brake from the shaft, electrical means which when an object whose speed is to be registered passes one of said initiating devices will remove the brake from the shaft for rotation of the shaft by said spring means, and when said object consecutively passes the other of said initiating devices the brake will engage the shaft and stop it, and means for relieving the stress in the spring means after the registering operation for resetting purposes.

2. Apparatus as claimed in claim 1, in which said spring means includes a spring member having a cord connected thereto, said cord being wound around the shaft to rotate the shaft from the pull of the spring member when the brake is moved away from the shaft.

3. Apparatus as claimed in claim 2, including a weaker counterbalancing spring on the opposite side of the shaft for returning said shaft and pointer to starting position.

4. In speed registering apparatus in combination, a frame, a shaft rotatably mounted in said frame, a pointer fixed to the shaft, a dial adjacent the pointer, spring means having a cord attached thereto, the other end of the cord being wound round the shaft, a solenoid below said shaft, a brake having a stem slidably mounted in the core of said solenoid, a compression spring engaging said stem, an enlarged foot on the shaft to be engaged by the brake when the solenoid is deenergized and to be free of the brake when the solenoid is energized, said spring means and cord rotating the shaft in registering direction when the solenoid is energized.

5. Apparatus as claimed in claim 4, including means on said spring means for selectively applying and relieving pulling stress in the spring means.

6. Apparatus as claimed in claim 5, having on the side of the shaft opposite from the spring means a device for returning the shaft and pointer to starting position when said spring means is relieved and the solenoid is energized.

7. In speed registering apparatus in combination, a frame, a shaft rotatably mounted in said frame, a pointer fixed to the shaft to rotate therewith, a solenoid operatively adjacent said shaft, a brake operated by said solenoid to engage said shaft when the solenoid is deenergized and to release the shaft when the solenoid is energized, a spring holder arm pivoted to the frame, a spring adjustably mounted on said arm, a cord connected at one end to said spring and wound round the shaft at the other end for rotating the shaft and pointer, whereby said arm may be swung in one direction to put stress in the spring for rotating the shaft through the cord when the solenoid is energized, and said arm may be swung in the other direction to relieve the stress in the spring.

8. Apparatus as claimed in claim 7, including a second spring on the frame having a cord wrapped round the shaft in the opposite direction from the first mentioned cord to rotate the shaft in the opposite direction when the stress is relieved in the first mentioned spring and the brake is released from the shaft.

9. Apparatus as claimed in claim 8, including a second arm pivoted to the frame, and means on said second arm for moving the first arm in a direction to relieve the stress in the first mentioned spring.

10. Apparatus as claimed in claim 9, including means on said second arm for moving the brake away from the shaft when the stress is relieved in the first mentioned spring, whereby the shaft and pointer may be returned to starting position by said second spring.

11. In speed registering apparatus in combination, a frame having a shaft rotatably mounted therein, a pointer on the shaft, a solenoid, a brake operated by said solenoid for selectively holding and releasing said shaft, a spring laterally spaced from said shaft and having a flexible cord-like element wound round the shaft for rotating the shaft and pointer in speed registering direction, and electric circuits connected to the solenoid for releasing the brake from the shaft for rotation of the shaft in speed registering direction when the solenoid is energized, and to apply the brake to the shaft and stop rotation thereof when the solenoid is deenergized.

12. Apparatus as claimed in claim 11, including means for selectively stressing and relieving said spring, and a second spring for rotating the shaft in the opposite direction to return it to starting position when the first mentioned spring is relieved and the brake is moved away from the shaft.

13. Apparatus as claimed in claim 12, in which both of said springs are normally flat leaf springs, and said second spring is weaker than the other one.

14. Apparatus as claimed in claim 13, in which said second spring also has a cord-like element attached thereto and wound round the shaft, one of said cord-like elements being wrapped round the shaft in one direction, and the other wrapped round the shaft in the opposite direction.

15. In speed registering apparatus, in combination, a frame having a shaft rotatable therein, a pointer on said shaft, a brake movable against the shaft to hold it stationary, and away therefrom to permit it to rotate, a first spring for rotating the shaft in speed registering direction when the brake is away therefrom, a weaker second spring for rotating the shaft in the opposite direction when the stress is relieved in the first spring and the brake is away from the shaft, and a resetting arm pivotally mounted on the frame and having means for relieving the stress in said first spring and moving the brake away from the shaft whereby said second spring may rotate the shaft back to starting position.

16. In speed registering apparatus in combination, a frame having a shaft rotatable therein, a pointer on said shaft, a solenoid adjacent one end of the shaft, a brake operated by said solenoid to contact the shaft to hold it stationary when the solenoid is deenergized and to be moved away from the shaft to permit it to rotate when the solenoid is energized, a spring to rotate the shaft when free of the brake, a control panel having a pair of spaced swingable arms each provided with spaced contact point holders, a pair of spaced standards fixed to the panel between the swingable arms and each standard having a point holder, a pair of standards fixed to the panel one on the outside of each of said swingable arms, each of the outside standards having a pair of spaced point holders, an electromagnet on the panel adjacent the free end of each of the swingable arms, an armature latch for each swingable arm, and electrical circuits between the parts on said panel and said solenoid, some of the contact points on the panel having spring resistance to yield a limited amount when struck by its companion contact point.

17. Apparatus as claimed in claim 16, in which the contact points having spring resistance are those in said standards.

18. In speed registering apparatus in combination, a frame having a shaft rotatable therein, spring means for rotating said shaft in a speed registering direction, a brake for said shaft, a solenoid for operating said brake to remove the brake from the shaft when the solenoid is energized and to spring-press the brake against the shaft when the solenoid is deenergized, a control panel having switches and a pair of electromagnets, and electrical circuits between the panel switches and electromagnets, and the solenoid, so arranged that when one of said electromagnets is temporarily operated the solenoid will be energized to remove the brake from the shaft and enable said spring means to rotate the shaft, and when the other electromagnet is temporarily operated the solenoid will be deenergized to move the brake against the shaft to stop its rotation.

19. Apparatus as claimed in claim 18, in which said spring means is a flat, tempered spring, a swingable spring holder on which said spring is adjustably mounted to adjust its stress, an adjustable stop against which the spring holder strikes on its outward movement, and resilient means for normally urging the spring holder against said stop.

20. In speed registering apparatus in combination, a frame, a shaft rotatably mounted in said frame, a pointer fixed to the shaft, a dial adjacent the pointer, a brake movable into and out of braking contact with said shaft, means for applying and releasing said brake to and from the shaft, a first spring connected with said shaft for rotating it for a speed registering operation when the brake is released from the shaft, a second spring weaker than said first spring and connected with the shaft for rotating it in the opposite direction from that of the first spring, and means having connection with the first spring and brake for simultaneously releasing the brake from the shaft and relieving the stress in the first spring to enable the second spring to rotate the shaft in a direction to restore it to its starting position.

21. In speed registering apparatus in combination, a frame, a shaft rotatably mounted in the frame, a pointer fixed to the shaft, a dial opposite the pointer, a brake movable into and out of braking engagement with the shaft, and a spring having a flexible cord-like element secured thereto and wound around the shaft to rotate it in speed registering direction when the brake is released from the shaft, and means for applying the brake to the shaft for stopping rotation of the shaft at the end of the registering operation.

ERNEST J. DOWDEN.

References Cited in the file of this patent

UNITED STATES PATENTS

| Number | Name | Date |
|---|---|---|
| 1,494,986 | Behm | May 20, 1924 |
| 2,255,266 | Moorefield | Sept. 9, 1941 |
| 2,361,826 | Dowden | Oct. 31, 1944 |